June 4, 1935.  W. S. MARTIN  2,003,895
SERVING UTENSIL
Filed July 16, 1934
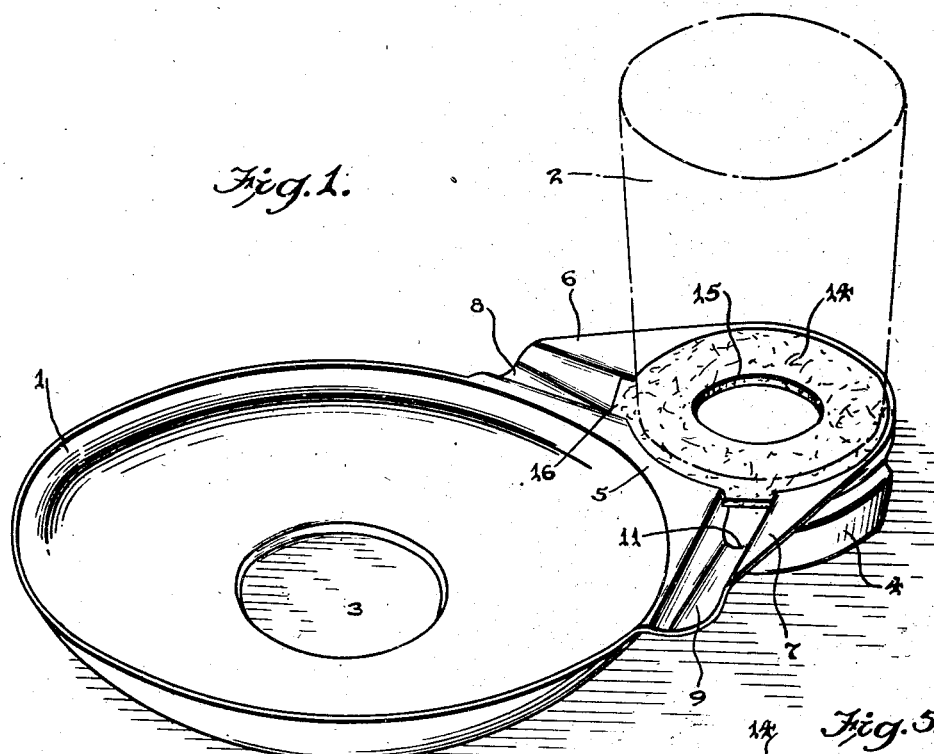
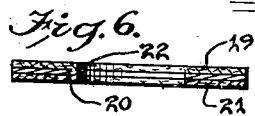
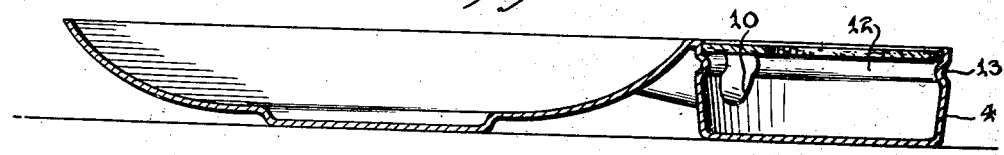
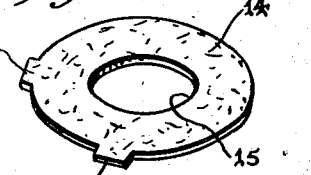
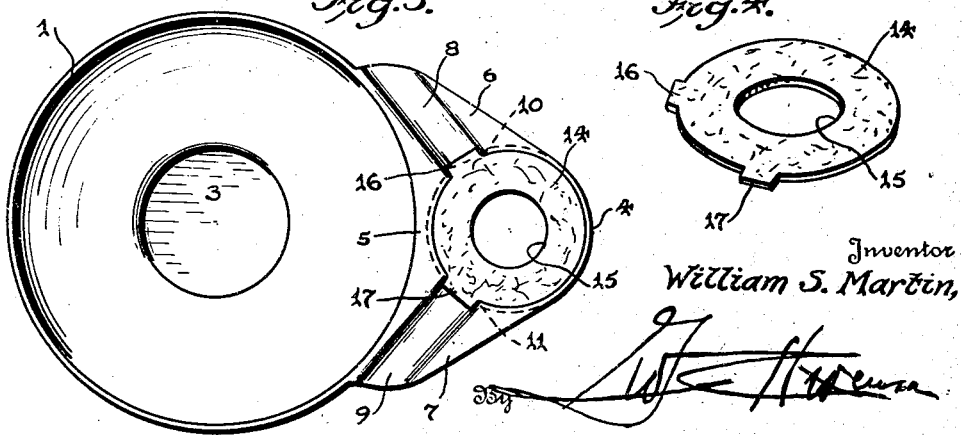
Inventor
William S. Martin,
By
Attorney Patented June 4, 1935

2,003,895

UNITED STATES PATENT OFFICE 2,003,895

SERVING UTENSIL

William S. Martin, Rochester, N. Y.

Application July 16, 1934, Serial No. 735,498

21 Claims. (Cl. 131—51)

This invention relates to a combined food, liquid or beverage or the like supporting means and an ash receiver associated therewith. Cold liquids and beverages, such as ice tea, ginger ale, beer and other drinks are frequently served in a manner which causes drippings from the drink containers or vessels as the latter are lifted for drinking purposes to drop on tables, counters or the like and sometimes on the clothes of persons. These drippings may be caused by overflow of the liquid over the upper edge of a tumbler, glass or other drinking container or vessel or by reason of moisture incident to condensation due to the preparation of cold drinks in particular. These drippings from the drinking vessels may happen at hostelries, clubs, lunch rooms, parties or under ordinary conditions in households. Sometimes waiters and waitresses in hotels, clubs, lunch rooms and other places serve cold and hot drinks on trays and these trays are frequently moist and drippings fall from the liquid or beverage vessels as they are lifted from the trays and served to patrons. These drippings are sometimes injurious to furniture and to clothes for personal wear. There are times at home or other gatherings when it is important that furniture and clothes be protected from the drippings of drinking vessels and from the burning of the furniture and tablecloths incident to ashes falling from cigars and cigarettes and especially when drinks alone are being served in public or at home smokers frequently deposit ashes from cigars and cigarettes in saucers or dishes in which the drinks might be supported in the serving thereof and in such instances provision is not made against such drippings from the liquid or beverage containing vessels.

It is therefore one object of the present invention to provide a service device or utensil for the support of liquid or beverage containing vessels and associated with which means is provided to effect removal of moisture from the bottoms of the vessels as the liquids are served to patrons or friends or whereby the user prior to partaking of the liquid or beverage may readily wipe or remove the moisture from the bottom of the vessel to prevent drippings from the vessel.

Another object of the invention resides in the provision of a service device or utensil, embodying among other characteristics, means for the support of food or a liquid or beverage containing vessel or upon which both food or liquids and beverages may be supported and associated with such supporting means is an ash receiver having a combined closure and absorbent supporting means on which the bottom of a liquid or beverage containing vessel may be supported or moved to remove moisture from the bottom of the vessel to prevent drippings of moisture from the vessel as it is lifted for drinking purposes.

A still further object of the invention resides in the provision of a tray or the like embodying two supporting portions designed especially for the support of a liquid or beverage containing vessel and which is light in weight and which may be transported from one place to another or which may remain stationary on a table, counter or other supporting means for the support of the liquid or beverage containing vessel and one of which supporting means is provided with absorbent material over which the liquid or beverage containing vessel may be operated to wipe or otherwise remove moisture from the bottom of the vessel to prevent drippings of moisture from the vessel when the latter is lifted for drinking purposes.

It is still further designed to provide an individual service tray or the like for use in hostelries, clubs, lunch rooms or in the household at meal time or at the time of parties and which embodies oppositely disposed connected liquid or beverage containing vessel supporting portions, one portion constituting an ash receiver provided with a combined cover and an absorbent vessel supporting means whereby the liquid or beverage containing vessel may be readily shifted from one supporting portion to the other and when positioned on said combined cover and supporting portion capable of being operated thereon to wipe therefrom moisture from the bottom thereof to prevent drippings of moisture from the vessel when lifted for drinking purposes and in which device provision is also made for the support of live or dead cigars or cigarettes.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing:—

Figure 1 is a perspective view of the invention illustrating a tumbler, glass or other vessel mounted on one of the supporting portions of the individual utensil designed for the purposes hereinbefore and hereinafter stated.

Fig. 2 is a sectional view on the line 2—2 of Fig. 1 with the drinking vessel removed.

Fig. 3 is a top plan view of the invention shown on a smaller scale.

Fig. 4 is a detail perspective view of one form of absorbent supporting means for the ash receiver.

Fig. 5 is a detail sectional view of a modified form of cover and vessel supporting member for the ash receiver.

Fig. 6 is a sectional view of a still further modification of combined ash receiver, cover and absorbent vessel supporting means.

Referring now more particularly to the accompanying drawing, the reference character 1 indicates a dished tray or liquid or beverage containing vessel support, which, as illustrated, is fashioned somewhat after the nature of a dish or saucer and it may be constructed of stainless metal, chinaware, glass, composition materials or any other suitable material. This tray or support 1 is particularly adapted for the support of a tumbler, goblet, glass or any other type of liquid, beverage or the like containing vessel 2 which is generally supported in the center 3 of the tray or support 1.

A cylindrical ash receiver 4 is shown as associated with the tray or support 1 and it may be connected rigidly thereto in any suitable manner and this ash receiver may be composed of any suitable material but it is preferably of the same material as that of which the tray or support 1 may be formed.

One manner of means for rigidly connecting the tray or support 1 and the ash receiver 4 together may reside in a connecting web 5, including wings 6 and 7. This web 5 and the wings 6 and 7 are preferably connected to the upper edges of the tray or support 1 in any suitable manner and if the web 5 and the wings 6 and 7 are formed of sheet metal or similar material and the tray or support 1 and the ash receiver 4 are composed of like material the connections between the web and wings and the tray or support 1 and ash receiver 4 may be effected by welding, soldering or otherwise.

The wings 6 and 7 are provided with grooves 8 and 9, respectively for the support of cigars or cigarettes. The sides of these grooves 8 and 9 preferably flare inwardly and have sloping bottoms, as shown. The grooves 8 and 9 are preferably open ended and the inner ends thereof communicate with the interior of the ash receiver 4 through openings 10 and 11, respectively formed in the side walls of the ash receiver 4 so that the smoked ends of the cigars or cigarettes may lie within the ash receiver 4 when supported in the grooves 8 and 9 or otherwise positioned in the grooves as may be desired.

The ash receiver 4 has an interior rib 12 formed as the result of the formation of an external continuous groove 13. This rib 12 is broken as regards continuity at the aforesaid openings 10 and 11 and it is disposed preferably adjacent the upper edge of the ash receiver 4 to form a seat for the effective support of a supporting member 14 designed to support the liquid or beverage containing vessel 2 over the ash receiver 4 and to provide a cover for the latter. This supporting member 14 is provided with a central or other opening 15 which is designed to permit the passage of ashes therethrough into the ash receiver when the liquid or beverage containing vessel 2 is not disposed on the supporting member 14. The vessel supporting member 14 may be provided with peripheral lugs 16 and 17 adapted to fit in the respective grooves 8 and 9 in the wings 6 and 7, respectively so as to prevent rotative movement of the vessel supporting member 14 on the ash receiver 4. This vessel supporting member 14 is preferably composed of absorbent material and it is reversible in that it may be turned from one side face to the other side face with the lugs 16 and 17 arranged to fit in the respective grooves 8 and 9 when the member 14 is reversed. This vessel supporting member 14 may be formed of asbestos or other relatively stiff material such as blotting material or the like and it is adapted to absorb drippings from the liquid or beverage containing vessel 2 incident to overflow of liquid or fluid from the latter or because of condensation incident to the chilling of drinks through the medium of ice. In the event of undue wear or other deterioration of the supporting member 14 it may be readily replaced by an unused device of similar form and character. Ordinarily the liquid or beverage containing vessel 2 is disposed in the center 3 of the tray or support 1 and transported by a waiter or maid or other person from one place to another, or if desired or the vessel 2 may be filled at a table, counter or the like while the vessel is positioned in the center of the tray or support 1. To prevent drippings from the vessel 2 finding their way to a tablecloth, table, counter or the clothes of the user the vessel 2 may be lifted from the center 3 of the tray or support 1 and placed on the absorbent supporting member 14 where by the hand of the user the vessel 2 may be given a rotative or oscillative movement with the bottom of the vessel 2 on the support 14 to wipe away or remove the drippings from the bottom of the vessel 2 as should be well understood.

I do not wish to be limited to the particular type of rib or shoulder or seat 12. The vessel supporting member 14 may be supported in various other ways than that illustrated. I do not wish to be limited to the particular kind of material of which the supporting member 14 is composed. It may be composed of any suitable material, even metal, if desired but it is preferable that it be composed of asbestos, pasteboard, blotting paper or the like so as to be effective for the wiping of the bottom of the vessel 2 in the manner previously stated so as to prevent drippings incident to overflow or condensation from the vessel 2 as it is taken from over the supporting device for the partaking of a drink from the vessel. There may be times when it is desired that the member 14 be fixed on a suitable seat in the ash receiver or that the supporting member 14 be positioned in any suitable manner over the upper open portion of the ash receiver and I comprehend such embodiment of the invention in one aspect thereof. There may be times when it is desired that the vessel supporting member 14 be rotatable on the rib form or other shoulder or seat 12 and in such an event the lugs 16 and 17 are eliminated but as shown as projecting from the periphery of the supporting member 14 these lugs 16 and 17 effectively prevent rotative movement of the supporting member 14 when it is desired that the same be readily removable and insertable but not rotatable.

I wish it also understood that in one aspect of the invention the cigar and cigarette holding grooves 8 and 9 may be eliminated from the device and I believe that I have made it clear that the unitary device including the tray or support 1 and the ash receiver 4 and the web 5, including the wings 6 and 7 may be formed of separate pieces of material or stamped, molded or otherwise formed in one piece of material.

It might be preferable under certain conditions to mount the absorbent supporting member 14 on a relatively stiff member 18 and either attach it to the member 18 or have it detachable with relation thereto. The additional supporting member 18 would, of course, have an opening 18a adapted to coincide with the opening 15 in the member 14. If the two members 14 and 18 are secured together and both composed of absorbent material the supporting member 14—18 is reversible as in the case of the use of the single member 14. However, this member 18 may be formed of material other than absorbent material but the member 14 preferably possesses absorbent characteristics so as to provide for the wiping away or removal of moisture from the bottom of the cup, glass or other liquid or beverage container before the latter is lifted off of the supporting means disposed on the ash receiver 4.

In the use of the device embodying my invention the same may be used in various ways. The vessel 2 may be positioned normally or generally on the supporting means therefor over the ash receiver 4 or the vessel 2 may be supported normally or generally at the center 3 of the tray or support 1 and disposed over the ash receiver 4 only for the purpose of removing drippings or moisture from the bottom of the vessel 2 before drinks are to be partaken from the vessel 2. In hostelries, clubs of similar places it may be preferable for the sake of safety that the waiter, waitress or other attendant carry the vessel 2 containing liquids or beverages on the tray or support 1 and especially as it would facilitate the removal of ashes from cigars or cigarettes if the vessel 2 were not normally disposed over the ash receiver 4 it might be preferable in most instances to permit the vessel 2 to be supported on the tray or support 1. In any event the device is preferably light and it is preferably substantial and may be conveniently and readily transported from shelves to tables in hotels, clubs and similar places as will be readily understood. The device is particularly serviceable for use at bridge or other parties and is economical of manufacture and as the side walls of the ash receiver 4 preferably taper downwardly it is possible to provide for a nestling or at least a partial nestling of a plurality of the devices together for storage or for transportation purposes.

For instance, a superimposed ash receiver 4 may be seated partially at least in a lower ash receiver 4 and accordingly the superimposed tray or support 1 will be partially seated in the lower dished tray or support 1 and which latter member is preferably dished to prevent escape of any water, moisture or drippings which may overflow from the vessel 2 onto the tray or support 1. If this tray or support 1 were formed of shape other than circular as it may well be made the ash receiver 4 could remain cylindrical or its shape might also be altered to present other than a cylindrical formation. In other words the tray or support 1 and the ash receiver 4 may be formed of oval, hexagonal, rectangular or other shape as may be preferred.

In certain uses of the invention it is possible that crackers, cakes or the like may be served alongside of the vessel 2 of the tray or support 1. As a matter of fact cakes or other food materials might be served on the tray or support 1 and the liquid or beverage containing vessel 2 might be supported at such times on the supporting means 14 or the supporting means 14—18 over the ash receiver 4.

In Fig. 6 there is illustrated a further form of combined ash receiver cover and vessel support wherein the same may be composed of a series of superimposed members 19, 20 and 21. The members 19 and 21 are preferably composed of suitable absorbent material and the intermediate member 20 may be also composed of absorbent material or it may be composed of metal or other material to stiffen the combined cover and vessel support. The several members 19, 20 and 21 have alining openings 22 and like the form illustrated in Fig. 5, as well as the form illustrated in Figs. 1 to 4, inclusive, the members 19, 20 and 21 may or may not include the peripheral lugs for disposition in the cigar and cigarette supporting grooves of the connecting means between the tray and the ash receiver.

What is claimed is:

1. A device of the character described comprising a food, liquid or beverage vessel supporting portion and an ash receiver connected thereto, and a member extending across the upper portion of the ash receiver and removably mounted on the upper portion of the ash receiver for the support of the liquid or beverage vessel.

2. A device of the character described comprising a relatively large circular disk shaped food, liquid or beverage vessel supporting portion and an ash receiver of cylindrical shape and of smaller cross-sectional diameter than the cross-sectional diameter of the said disk shaped portion and connected thereto, and a flat member reing across the upper portion thereof and removably supported by the side wall of the ash receiver for the support of the liquid or beverage vessel, said member forming a removable cover for the ash receiver and having an opening therein for the passage therethrough of cigar or cigarette ashes into the ash receiver.

3. A device of the character described comprising a food, liquid or beverage vessel supporting portion and an ash receiver connected thereto, and a member removably mounted on the ash receiver for the support of the liquid or beverage vessel, said member forming a removable cover for the ash receiver and having an opening therein for the passage therethrough of cigar or cigarette ashes into the ash receiver, the connection between the said food, liquid or vessel supporting portion and the ash receiver having cigar and cigarette supporting grooves therein.

4. A device of the character described comprising a food, liquid or beverage vessel supporting portion and an ash receiver connected thereto, and a member removably mounted on the ash receiver for the support of the liquid or beverage vessel, said member forming a removable cover for the ash receiver and having an opening therein for the passage therethrough of cigar or cigarette ashes into the ash receiver, the connection between the said food, liquid or vessel supporting portion and the ash receiver having cigar and cigarette supporting grooves therein and leading through the side wall of the ash receiver to the interior of the latter below said combined supporting and cover member.

5. A device of the character described comprising a food, liquid or beverage vessel supporting portion and an ash receiver connected thereto, and a member removably mounted on the ash receiver for the support of the liquid or beverage vessel, said member forming a removable cover for the ash receiver and having an opening therein for the passage therethrough of cigar or cigarette ashes into the ash receiver, the connection between the said food, liquid or vessel supporting portion and the ash receiver having cigar and cigarette supporting grooves therein and leading through the side wall of the ash receiver to the interior of the latter below said combined supporting and cover member, said combined supporting and cover member having lugs projecting from the periphery thereof and extending into said grooves to prevent rotation of the same.

6. A device of the character described comprising a food, liquid or beverage vessel supporting portion and an ash receiver connected thereto, and a member removably mounted on the ash receiver for the support of the liquid or beverage vessel, said member forming a removable cover for the ash receiver and having an opening therein for the passage therethrough of cigar or cigarette ashes into the ash receiver, the connection between the said food, liquid or vessel supporting portion and the ash receiver having cigar and cigarette supporting grooves therein and leading through the side wall of the ash receiver to the interior of the latter below said combined supporting and cover member, said combined supporting and cover member having lugs projecting from the periphery thereof and extending into said grooves to prevent rotation of the same, said combined support and cover member being composed of absorbent material to take drippings and moisture from the bottom of said vessel.

7. A device of the character described comprising two spaced liquid or beverage vessel supporting portions connected together, one of said portions constituting an ash receiver, and a flat horizontally disposed absorbent member removably mounted across the top of the ash receiver and supported by the upper portion of the latter to absorb moisture from said vessel and having an opening therein for the passage of cigar and cigarette ashes into the ash receiver.

8. A device of the character described comprising two spaced liquid or beverage vessel supporting portions connected together in spaced relation, one of said portions constituting an ash receiver, and a flat laminated absorbent member removably mounted across the top of the ash receiver portion of the device to provide a cover for the ash receiver and to support the liquid or beverage containing vessel to absorb moisture from the latter and provided with an opening for the passage of cigar and cigarette ashes into the ash receiver when the said vessel is removed from said member.

9. A device of the character described comprising a member including an ash receiver having an interior seating means, and an absorbent member extending across the ash receiver and removably disposed on said seating means to form a cover for the ash receiver and adapted to absorb moisture from a liquid or beverage containing vessel supported thereon.

10. A device of the character described comprising a member including an ash receiver having an interior seating means, and an absorbent member extending across the ash receiver and removably disposed on said seating means to form a cover for the ash receiver and adapted to absorb moisture from a liquid or beverage containing vessel supported thereon, said member having an opening therein for the passage of cigar and cigarette ashes into the receiver.

11. A device of the character described comprising a member including an ash receiver having an interior seating means, and a member extending across the ash receiver and removably disposed on said seating means to form a cover for the ash receiver and adapted to support a liquid or beverage containing vessel thereon, said member including a plurality of superimposed layers of absorbent material having alining openings for the passage of cigar and cigarette ashes into the ash receiver.

12. A device of the character described comprising a member including an ash receiver having an interior seating means, and a member extending across the ash receiver and disposed on said seating means to form a cover for the ash receiver and adapted to support a liquid or beverage containing vessel thereon, said member including a plurality of superimposed layers of material having alining openings, one of the layers being stiffer than the remaining layers.

13. A device of the character described comprising a food, liquid or beverage vessel supporting portion and an ash receiver connected thereto, and a member removably mounted on the ash receiver for the support of the liquid or beverage vessel, said member forming a removable cover for the ash receiver, the connection between the said food, liquid or vessel supporting portion and the ash receiver having cigar and cigarette supporting grooves therein.

14. A device of the character described comprising a food, liquid or beverage vessel supporting portion having a central depression therein, an ash receiver, a web connecting the supporting portion and the ash receiver at their upper edges and spacing them slightly apart, and a flat absorbent member extending across the upper portion of the ash receiver and forming a removable cover for the latter and also serving as means on which a liquid or beverage containing vessel may be supported or the bottom of which vessel may be wiped to remove moisture from the bottom of the vessel.

15. A device of the character described comprising a food, liquid or beverage vessel supporting portion, an ash receiver, a web connecting the supporting portion and the ash receiver at their upper edges and spacing them slightly apart, and a flat absorbent member extending across the upper portion of the ash receiver and forming a removable cover for the latter and also serving as means on which a liquid or beverage containing vessel may be supported or the bottom of which vessel may be wiped to remove moisture from the bottom of the vessel.

16. A device of the character described comprising two supporting portions connected together, one of said portions constituting an ash receiver, and a flat removable and reversible cover member extending across the upper portion of the ash receiver, the ash receiver having an ash receiving opening in the side wall thereof below the cover member.

17. A device of the character described comprising a food, liquid or beverage vessel supporting portion and an ash receiver connected thereto and a cover member removably mounted said food, liquid or vessel supporting portion and on the ash receiver, the connection between the the ash receiver having cigar and cigarette supporting grooves therein.

18. A device of the character described comprising a food, liquid or beverage vessel supporting portion and an ash receiver connected thereto and a cover member removably mounted on the ash receiver, the connection between the said food, liquid or vessel supporting portion and the ash receiver having cigar and cigarette supporting grooves therein and leading through the side wall of the ash receiver to the interior of the latter below the cover member.

19. A device of the character described comprising a food, liquid and beverage vessel supporting portion and an ash receiver connected thereto and a cover member extending entirely across the upper portion of the ash receiver and removably mounted thereon.

20. A device of the character described comprising two supporting portions, one of said portions constituting an ash receiver, and a cover member for the ash receiver removably supported on the latter at the upper portion of the interior thereof and having an opening therein for the passage of cigar and cigarette ashes into the ash receiver, the lower portion of the ash receiver below the cover member supporting portion being unobstructed.

21. A device of the character described comprising two supporting portions, one of said portions constituting an ash receiver, and a cover member for the ash receiver removably seated in the latter across the upper portion of the interior thereof and having an opening therein for the passage of cigar and cigarette ashes into the ash receiver, the entire floor of the ash receiver being adapted to receive ashes, said cover being composed of absorbent material and reversible and adapted to absorb moisture from the bottom of a drinking vessel when the latter is moved thereover.

WILLIAM S. MARTIN.

CERTIFICATE OF CORRECTION.

Patent No. 2,003,895.                                                       June 4, 1935.

WILLIAM S. MARTIN.

It is hereby certified that error appears in the printed specification of the above numbered patent requiring correction as follows: Page 3, first column, line 36, for "of" read or; and page 4, second column, line 74, claim 17, strike out the words "said food, liquid or vessel supporting portion and" and insert the same after line 75, of said claim; and that the said Letters Patent should be read with these corrections therein that the same may conform to the record of the case in the Patent Office.

Signed and sealed this 16th day of July, A. D. 1935.

(Seal)                                                                        Leslie Frazer
                                                                            Acting Commissioner of Patents.